March 8, 1966 R. E. BONNER 3,239,811

WEIGHTING AND DECISION CIRCUIT FOR USE IN SPECIMEN RECOGNITION SYSTEMS

Filed July 11, 1962 14 Sheets-Sheet 1

INVENTOR.
RAYMOND E. BONNER

BY John J. Goodwin

ATTORNEY

March 8, 1966 R. E. BONNER 3,239,811

WEIGHTING AND DECISION CIRCUIT FOR USE IN SPECIMEN RECOGNITION SYSTEMS

Filed July 11, 1962 14 Sheets-Sheet 6

United States Patent Office 3,239,811
Patented Mar. 8, 1966

3,239,811

WEIGHTING AND DECISION CIRCUIT FOR USE IN SPECIMEN RECOGNITION SYSTEMS

Raymond E. Bonner, Yorktown Heights, N.Y., assignor to International Business Machines Corporation, New York, N.Y., a corporation of New York Filed July 11, 1962, Ser. No. 209,146
6 Claims. (Cl. 340—146.3)

The present invention relates to specimen recognition systems such as character and speech recognition devices, and more particularly to circuits useful in such devices for enhancing the recognition process.

In most specimen recognition or identification systems, the common operating procedure is that the unknown specimen is investigated for a particular class of properties. The presence and absence of certain of these properties enable the system to decide the identity of the specimen. Thus, speech signals contain characteristic frequency maximums defined as formants, and speech recognition systems have been designed to locate the positions of the formants within the signal to determine the type of sound. Likewise, the patterns of the various alphabetic and numeric characters differ from each other in shape and line. Character recognition systems have been designed to scan a character, register the properties of the character, and decide on the basis of the presence or absence of particular properties the identity of the character. The quantity and types of properties used in identifying a specimen will depend on the complexity and purposes of the recognition device.

In the design of recognition devices it is preferable to design the devices to investigate properties to distinguish one specimen from another (i.e. A vs. B, D vs. G, etc.) rather than to distinguish one specimen from all the others. When the properties of one pattern ("A") are compared against the properties of another pattern ("B"), the comparison ("A" vs. "B") is referred to as a "conflict pair."

The advantages of providing a recognition device which distinguishes conflict pairs are that it is simpler to locate properties which distinguish pairs of characters rather than one character from all the others; the information resulting from determined pairs may be used to resolve further conflicts; and such systems can handle any possible conflict pair which might arise.

For example, it requires a lesser number of properties to determine whether a specimen is an "A" or a "B," an "A" or a "C," etc. than to determine an "A" against "B," "C," "D," etc. When the conflict pairs related to a given character have been resolved, for example, when the conflict pairs (A vs. B), (A vs. C), etc. indicate that the specimen is not "A," this information may be used by the system so as to make it unnecessary to consider the character A in the other conflict pairs (B vs. A), (C vs. A), D vs. A), etc. This results in increased efficiency and reduces the complexity of the decision circuit. Another consideration of specimen recognition devices concerns the handling of the properties of the specimen. In determining a character it is common to "weight" the properties present in a given specimen such that a "reward" is given for the presence of a property and a "punishment" is given for the absence. Some known systems employ a resistor network to perform this function. The limitation of such known systems is that the "reward" is equal to the "punishment." This discourages the use of properties which occur infrequently because their usual absence will result in a reduced output voltage (i.e. "punishment") most of the time that the specimen being investigated is a member of the type the properties were chosen to recognize. However, there are certain properties which, although they occur infrequently for one character, occur much less frequently for all other characters. Thus, it would be useful to be able to utilize such properties in the recognition process.

Therefore, the present invention has been devised to overcome the above-mentioned limitations. In accordance with the invention, a circuit is provided for logical decision wherein a unique weighting arrangement is employed to permit the use of infrequently occurring properties and wherein, when a specimen has been determined to not be a given character, such possibility is removed from consideration in the processing of the remaining conflict pairs.

The present invention, although a single entity, may be considered as being a two-stage circuit, the first stage being responsive to the outputs of the property detectors of the recognition device for accomplishing the aforesaid unique weighting function. The second stage is responsive to the output of the first stage and handles the determination of the conflict pairs.

The present invention will be embodied, for purposes of description, in a typical character recognition environment, however, it is to be understood that the principles taught herein may be utilized in a wide variety of recognition devices, both in the character recognition and speech recognition arts.

An object of the present invention is to provide an improved decision circuit for specimen recognition.

Another object of the present invention is to provide a circuit which assigns weighted evaluations to properties associated with given specimens in proportion to their value.

A further object of the present invention is to provide a circuit having decision means for repeatedly reducing the number of conflict sets in determining specimen identity by eliminating resolved conflict pairs.

A still further object of the present invention is to provide a circuit for use in specimen recognition systems for producing improved, accurate operation thereof.

The foregoing and other objects, features and advantages of the invention will be apparent from the following more particular description of a preferred embodiment of the invention, as illustrated in the accompanying drawings.

Figure 1:
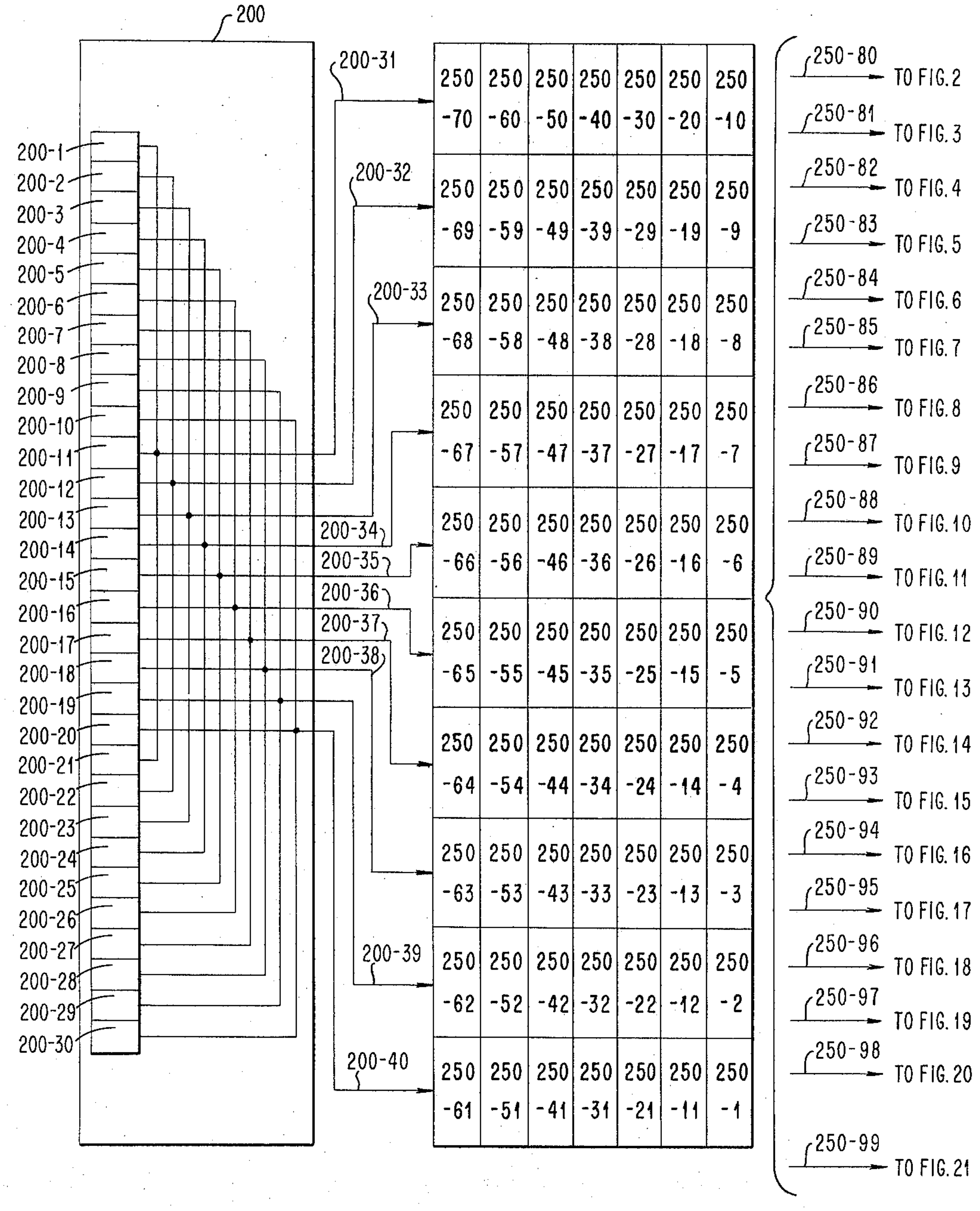
FIG. 1 is a schematic diagram of a read head and a storage matrix which are employed in the present invention.

Referring to FIG. 1, a character sensing device is shown including a read head 200 and a storage matrix 250. Read head 200 and storage matrix 250 are the specimen sensing portion of the system. For purposes of the present invention the specimen sensing apparatus may be selected from a wide range of such devices in the speech and character recognition arts. For example, in character recognition applications the invention may be utilized with optical sensors and magnetic sensors. In the preferred embodiment described herein the read head 200 and storage matrix 250 may represent the magnetic read head and the electronic character matrix of the "IBM" type 1412 Magnetic Character Reader, a system presently available in the art.

Read head 200 includes thirty reading gaps 200–1 to 200–30. The outputs of the reading gaps are connected together in the manner such that reading gaps 200–1, 200–11, and 200–21 are connected in a common output lead 200–31. Likewise, the outputs of reading gaps 200–2, 200–12, and 200–22 are connected to lead 200–32, reading gaps 200–3, 200–13, and 200–23 are connected to lead 200–33, and so on until the thirty reading gaps are coupled in threes to the ten output leads 200–31 to 200–40. Only ten reading gaps are used to scan the specimen. The thirty gaps 200–1 through 200–30 are provided to account for gross misregistration between the specimen and read head 200.

Leads 200–31 to 200–40 form ten data channels with three reading gaps for each channel, and are coupled to character matrix 250. As documents containing magnetic characters (not shown) are passed under read head 200, the area reserved for each character is scanned by the adjacent ones of the reading gaps 200–1 through 200–30. A significant amount of magnetized ink under any reading gap generates an electrical signal that enters into one of the ten associated data channels represented by leads 200–31 through 200–40. Thus, the area occupied by the character is effectively divided into ten horizontal divisions.

When the leading edge of a character passes the read head 200, a reading is taken. At clearly defined time intervals, six additional readings are taken within the width of the character. The horizontal width of the character is thereby divided, on a time basis, into seven segments; each of the ones of reading gaps 200–1 through 200–30 which detect magnetic ink enters a signal into one of the ten data channels 200–31 through 200–40 during each time interval. In this manner the area the character occupies is divided into a seven by ten matrix. The presence or absence of a signal (indicating the presence or absence of ink) in particular ones of the seventy matrix locations serves to identify the character.

The character matrix 250 accepts the signals from the ten data channels represented by leads 200–31 through 200–40. The matrix 250 has a storage location for each of the seventy character segments, which are designated 250–1 through 250–70. As specimens pass under read head 200, the lack of any appreciable signal from a character area segment causes the 0-bit to be stored in the associated matrix location. The presence of a significant signal (indicating magnetic ink is under the reading gap) causes a 1-bit to be stored in the specific matrix location. After the entire character has passed under the read head 200, and all the segments have been read, a pattern of the character shape is stored in the character matrix 250 as a configuration of 0-bits and 1-bits.

The storage locations 250–1 through 250–70 contain trigger circuits which provide the 1-bit or 0-bit storage. The electronic character matrix of the "IBM" type 1412 Magnetic Character Reader contains triggers which provide a −12 volt signal for the 0-bit and a zero volt signal for the 1-bit. For purposes of the present invention, the triggers in storage locations 250–1 through 250–70 of matrix 250 are designed to provide zero (ground) potential for the 0-bit and +V volts for the 1-bit. The value of the 1-bit voltage will hereinafter be referred to as +V as the magnitude thereof is merely a matter of design, being determined by the electron tubes and relays appearing in the circuit.

After the seventh reading by read head 200, when the entire specimen has been scanned, a pulse is generated by matrix 250 on output lead 250–99. This pulse is used to energize a relay to be later described.

In the usual instance, for example, in the "IBM" 1412 system, a logic system operates on the stored configuration in the character matrix 250 to look for key recognition shapes and characteristics to determine character identity. The decision logic circuit is connected to each of the seventy storage locations 250–1 through 250–70, and depending whether there is a 1-bit or a 0-bit in each location, the particular character is identified. In the present invention a unique decision logic circuit is provided to connect to character matrix 250 for more efficiently determining character identity.

Read head 200 and character matrix 250 are capable of reading and storing sufficient properties to enable fourteen characters to be identified, these being the digits 0 to 9 and four special symbols. In identifying the fourteen characters all the storage locations 250–1 to 250–70 are utilized. Because of the complexity of describing the present invention in relation to all fourteen characters, and because the invention can be fully understood by dealing with a lesser number of characters, the following discussion will be confined to the operation of the invention on a certain sample subset of the four characters; "3," "5," "8," and "9." An analysis of the shapes of these four characters indicated that they could properly be determined by looking at nineteen particular ones of storage locations 250–1 through 250–70. The particular storage loctions are 250–7 to 250–9, 250–14, 250–17, 250–33, 250–43, 250–47, 250–53 to 250–59, and 250–62 to 250–65. In FIG. 1 these storage locations are respectively connected in the aforementioned order to the nineteen leads 250–80 through 250–98. The leads 250–80 through 250–98 couple the outputs of the storage locations to nineteen separate circuits shown in FIGS. 2 through 20.

The circuits in FIGS. 2 through 20 generally include two branch circuits containing resistor networks. One branch is coupled directly to the incoming lead from character matrix 250 and the other branch is connected to the incoming lead via a flip-flop circuit. The flip-flop circuits in each of the circuits of FIGS. 2 through 20 are identical, and are designated by reference numeral 300. Flip-flops 300 convert 1-bits to 0-bits and vice versa. The resistors in each branch of the circuits of FIGS. 2 through 20 vary in number and value, and selected ones of the resistors may be decoupled by means of relay operated switches.

The function of the circuits shown in FIGS. 2 through 20 is to receive the signal from the associated storage location (either a 1-bit or a 0-bit) and weight the importance of the presence or absence of that "property" in relation to particular characters. Further, the circuits add "reward" and "punish" factors in accordance with the presence or absence of particular properties with respect to particular characters.

Figure 2:
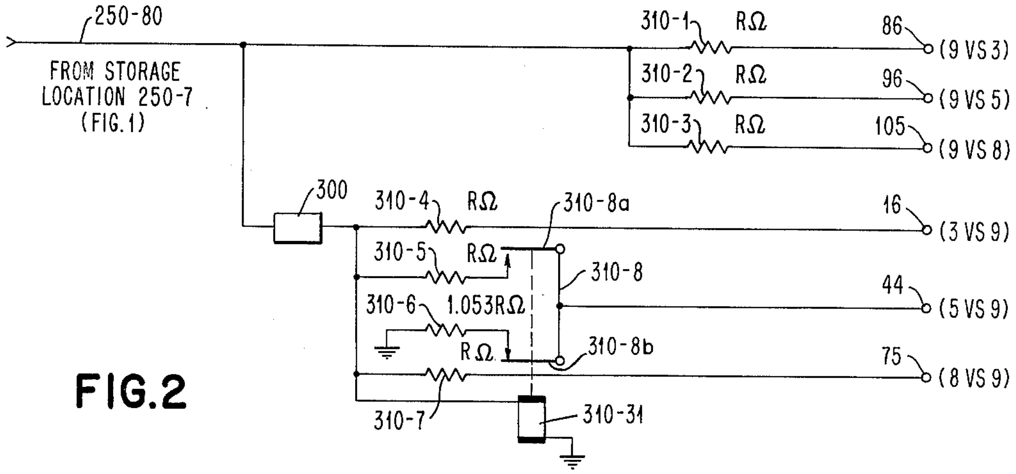
FIGS. 2 through 20 are schematic diagrams of property weighting circuits which are coupled to the outputs of the circuit of FIG. 1.

Referring to FIG. 2, a weighting circuit is shown which is coupled to storage location 250–7 via lead 250–80. The input signal on lead 250–80 will either be a +V volt signal (1-bit) indicating the presence of ink at a given portion of the specimen being investigated, or a zero (ground) volt signal (0-bit) indicating the absence of ink. Considering the storage location 250–7 in FIG. 1, it is seen that it is located at the extreme edge of character matrix 250 and approximately two-thirds from the bottom of the matrix. Since the seventy storage locations of the character matrix 250 encompass the character, one can mentally superimpose characters over the character matrix 250 as it is illustrated in FIG. 1. In doing so, it is seen that the presence of ink in the area occupied by storage location 250–7 will be a property associated with some characters and not with others. This is also true for the absence of ink in the storage location.

Referring to FIG. 2, the presence of ink in the area occupied by storage location 250–7 produces a +V volt signal on lead 250–80. This voltage appears across resistors 310–1, 310–2, and 310–3 raising the voltage levels at output terminals 86, 96, and 105. The output terminals 86, 96, and 105 are respectively associated with conflict pairs (9 vs. 3), (9 vs. 5), and (9 vs. 8) as will be more fully explained hereinbelow. Thus, the presence of a "property" in storage location 250–7 indicates that the specimen is more likely a "9" rather than a "3" or "5" or "8." It is to be noted that resistors 310–1, 310–2, and 310–3 are of equal value ("R" ohms) indicating that the probability of the specimen being a "9" rather than a "3" is the same as the probability that it is not a "5" or "8." The value of the resistance "R" is also a matter of design, being compatible with the voltage V and the type of electron tubes and relays employed in the circuit. The weights of the "properties" from the various ones of the seventy storage locations of character matrix 250 in relation to each character with respect to each of the others have been statistically calculated, as discussed hereinbelow, in order that corresponding values in terms of R ohms could be assigned to the various resistors included in the circuits of FIGS. 2 through 20.

The +V volt signal (1-bit) on lead 250–80 is also applied to flip-flop 300 where it becomes a 0-bit or ground potential signal. The ground potential signal from flip-flop 300 is applied to a resistor network including resistors 310–4, 310–5, 310–6, and 310–7. Resistor 310–4 is coupled directly to output terminal 16 which is associated with the conflict pair "3" vs. "9." Output terminal 44, associated with the conflict pair "5" vs. "9," is coupled to resistors 310–5 and 310–6 via ganged switch 310–8. The other end of resistor 310–5 is coupled to the output of flip-flop 300 and the other end of resistor 310–6 is coupled to ground potential. The contacts **310–8*a* and 310–8*b* of ganged switch 310–8 are opposed, so that when one contact is closed the other contact is open. The contacts are operated by relay 310–31 which is energized by the output signal of flip-flop 300. When the output of flip-flop 300 is a 1-bit (0-bit on lead 250–80) contact 310–8*a* is maintained closed and contact 310–8*b* is maintained open. When the output of flip-flop 300 is a 0-bit, contact 310–8*a* is open and contact 310–8*b* is closed. Resistors 310–4, 310–5 and 310–7 have the value R ohms and resistor 310–6** has a value of 1.053 times R ohms.

The values of the various resistors in FIGS. 2 through 20 were predetermined on a statistical basis. Samples of each of the characters were examined in relation to each of the property locations, that is, each of the storage locations 250–1 through 250–70 in FIG. 1. The total number of samples taken per character for each storage location was then divided into the number of times that storage location was found to contain a 1-bit. For example, consider storage location 250–7 (FIG. 1). Consider also that one hundred samples of the character "A" were scanned and that a 1-bit resulted in storage location 250–7 on ninety-six occasions. The 1-bit will not occur one hundred times in one hundred samples because of imperfections in the character (i.e. smudges, etc.) or in the printing (portions of ink missing, etc.) or in the scanning (poor registration, etc.). The probability factor of a 1-bit in location 250–7 determining an "A" is then 96/100 or 0.96. Consider too that one hundred samples of the character "B" produced a 1-bit in location 250–7 on thirty-two occasions. The probability factor of a 1-bit in location 250–7 determining a "B" is then 32/100 or 0.32. The "reward" factor for a 1-bit in location 250–7 with respect to the conflict pair ("A" vs. "B") is the ratio of the probabilities, that is 0.96/0.32=3. The "punishment" factor is the ratio multiplied by the probability factor of the character. The "punishment" would be $(0.96/0.32)\times 0.96=2.88$.

In FIGS. 2 through 20, in order to simplify the design, if any storage location had a calculated reward ratio of less than three for a given conflict pair, that location was eliminated from consideration, which accounts for the fact that only nineteen of the seventy possible storage locations of matrix 250 (FIG. 1) were utilized. For storage locations having reward ratios of ten or greater for any conflict pair, a weighting resistor of the value R ohms was assigned. For ratios between three and ten, the values of the resistors were calculated by the expression $$\frac{10}{\text{ratio}}=\frac{\text{resistor value}}{R\text{ ohms}}$$

Thus, for a ratio of 5, the resistor value would be 2R ohms.

The "punishment" resistor was calculated by the expression $$\text{resistance}=R\text{ ohms}\times\frac{\text{reward ratio}}{\text{punishment ratio}}$$

The punishment resistor will always have a resistance greater than or equal to R ohms. In the case of equality, only one resistor is used as both the reward and punishment resistor.

The above discussion related to the manner in which a 1-bit in a storage location is weighted in relation to the probability of determining characters. The presence of a 0-bit in particular storage locations is likewise valuable in identifying characters. A statistical evaluation of a number of samples of the characters was also made to determine the probability of a 0-bit in each location being associated with particular characters. The "probability" factors, the "reward" factors, and the "punishment" factors for the 0-bit occurrences were calculated as described hereinabove, and the values of the resistors were computed, also as described above.

Referring to FIG. 2, it was previously stated that the signal on lead 250–80 will be either a 1-bit or a 0-bit and that flip-flop 300 will convert a 1-bit to a 0-bit and vice versa. If a 1-bit is present, it indicates the presence of ink in a location corresponding to storage location 250–7. The 1-bit (in the form of a +V volt signal) is applied to resistors 310–1, 310–2, and 310–3. These resistors are of equal value and thus the probability is equal that the specimen being read is a "9" rather than a "3" or a "5" or an "8." Thus, terminals 86, 96, and 105 are connected to a +V volt potential through the RΩ resistors 310–1, 310–2, and 310–3. The 1-bit, having been converted to a 0-bit by flip-flop 300, resistors 310–4, 310–5, and 310–7 see a 0-bit (ground potential). Relay 310–31 is not energized, contact **310–8*a* remains open and contact 310–8*b* remains closed. The result is that terminals 16 and 75 are connected to ground potential through R ohm resistors 310–4 and 310–7 and terminal 44 is connected to ground through 1.053 ohm resistor 310–6**.

If a 0-bit were present on lead 250–80, terminals 86, 96, and 105 would now be connected to ground potential through R ohm resistors 310–1, 310–2, and 310–3. The 0-bit is converted to a 1-bit by flip-flop 300. Relay 310–31 is energized, contact **310–8*a* closes and contact 310–8*b* opens. Thus terminals 16, 44, and 75 are connected to a +V volt potential through R ohm resistors 310–4, 310–5, and 310–7**.

It is seen therefore, that when a 1-bit is present in storage location 250–7 the voltage levels of terminals 86, 96, and 105 are increased equal amounts by the +V volt signal across equal resistors 310–1, 310–2, and 310–3 (indicating the equal probability that the specimen is "9" rather than "3" or "5" or "8") whereas terminals 16, 44, and 75 are connected to ground potential, with terminal 44 being grounded through a larger value resistor than terminals 16 and 75. This larger resistor signifies that the state of line 250–80 has less effect on the output of terminal 44 than on the output of terminals 16 and 76 (less "punishment" for a zero voltage input).

Figure 3:
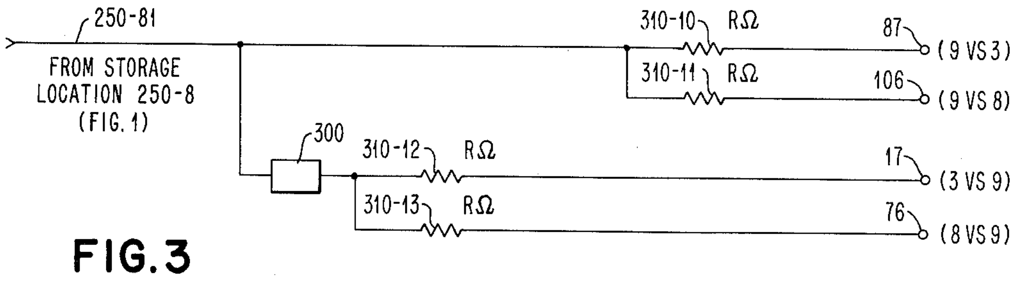

FIG. 3 shows the weighting circuit associated with storage location 250–8. The circuit of FIG. 3 is simpler than that of FIG. 2 in that all punishment values are equal to all reward values and so no relay (as 310–31) is required. When a 1-bit is present on lead 250–81, terminals 87 and 106 are connected to a +V volt potential via equal R ohm resistors 310–10 and 310–11 and terminals 17 and 76 are connected to ground potential through R ohm resistors 310–12 and 310–13 due to the operation of flip-flop 300. When a 0-bit is present on lead 250–81, terminals 87 and 106 are connected to ground potential through resistors 310–10 and 310–11 and terminals 17 and 76 are connected to a +V volt potential through resistors 310–12 and 310–13 due to the action of flip-flop 300.

Figure 4:
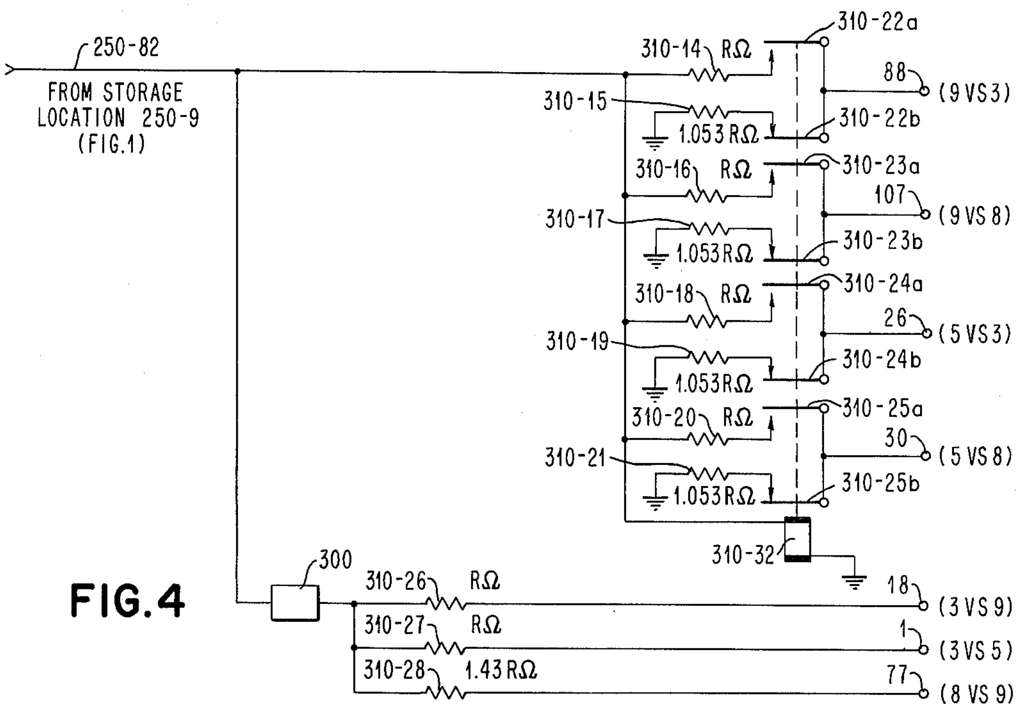

FIG. 4, showing the circuit associated with storage location 250–9, contains "punishment" resistors, but they are located in the branch not having the flip-flop. When a 1-bit is present on lead 250–82, relay 310–32 closes contacts **310–22*a*, 310–23*a*, 310–24*a*, and 310–25*a* and opens contacts 310–22*b*, 310–23*b*, 310–24*b*, and 310–25*b*. Terminals 88, 107, 26, and 30 are then connected to a +V volt potential via R ohm resistors 310–14, 310–16, 310–18, and 310–20. Flip-flop 300, however, converts the 1-bit to a 0-bit so terminals 18 and 1 are connected to ground potential through R ohm resistors 310–26 and 310–27 and terminal 77 is connected to ground potential through 1.43 R ohm resistor 310–28**.

If a 0-bit were present on lead 250–82, relay 310–32 would not be energized and contacts **310–22*a*, 310–23*a*, 310–24*a*, and 310–25*a* will be open and contacts 310–22*b*, 310–23*b*, 310–24*b*, and 310–25*b* will be closed. Terminals 88, 107, 26, and 30 are then connected to ground potential through 1.053 R ohm resistors 310–15, 310–17, 310–19, and 310–21. The 0-bit present on lead 250–82 is converted to a 1-bit by flip-flop 300 and terminals 18 and 1 are connected to a +V volt potential via R ohm resistors 310–26 and 310–27 and terminal 77 is connected to the +V volt potential via 1.43 R ohm resistor 310–28**.

FIGS. 5 through 20 are associated with storage locations 250–14, 250–17, 250–33, 250–43, 250–47, 250–53 through 250–59 and 250–62 through 250–65 respectively. The circuits operate in the same manner as was described in relation to the circuits of FIGS. 2, 3, and 4. The circuits contain two branches of resistor networks, with one branch having a flip-flop 300. Particular resistors in either branch or both branches may be decoupled by means of a relay energized by the input signal as described hereinabove. The values of the resistors will vary depending on the weight calculated for particular storage locations with respect to particular conflict pairs according to the method of calculation described hereinabove. In each of the FIGS. 5 through 20 the associated storage location and conflict pairs are indicated on the drawings as well as the calculated values of the resistors in terms of R ohms. Following the description of operation stated for FIGS. 2, 3, and 4, one skilled in the art should be able to understand the operation of the circuits of FIGS. 5 through 20, therefore a detailed discussion of these circuits is not given herein.

Figure 5:
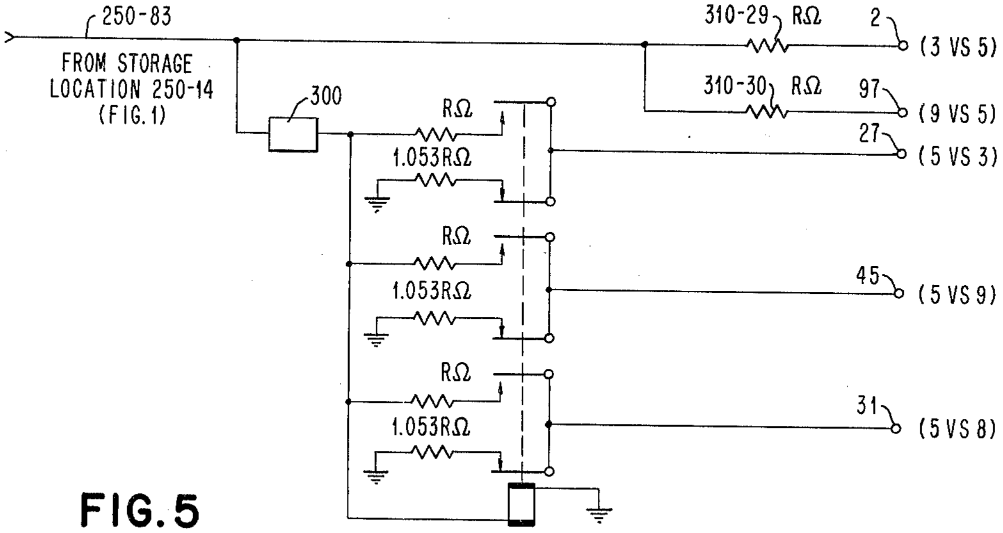
Figure 6:
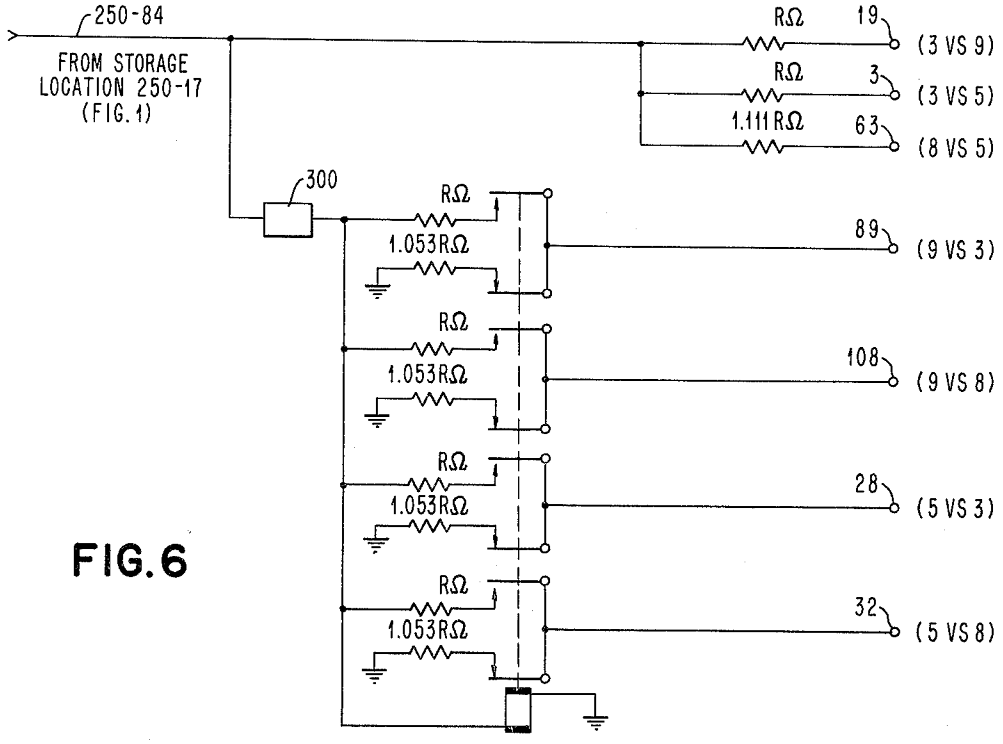
Figure 7:
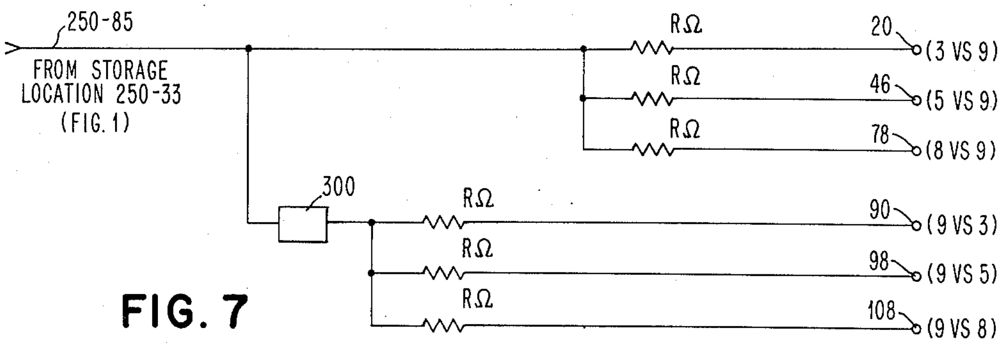
Figure 8:
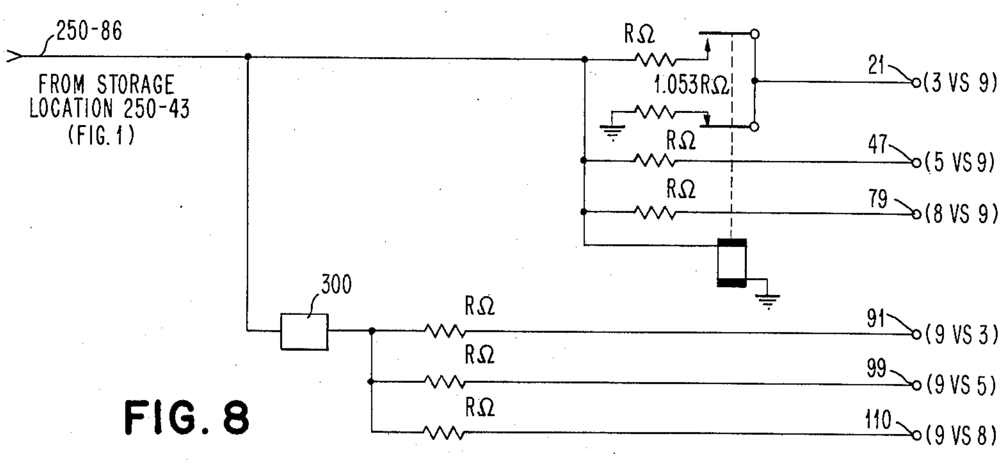
Figure 9:
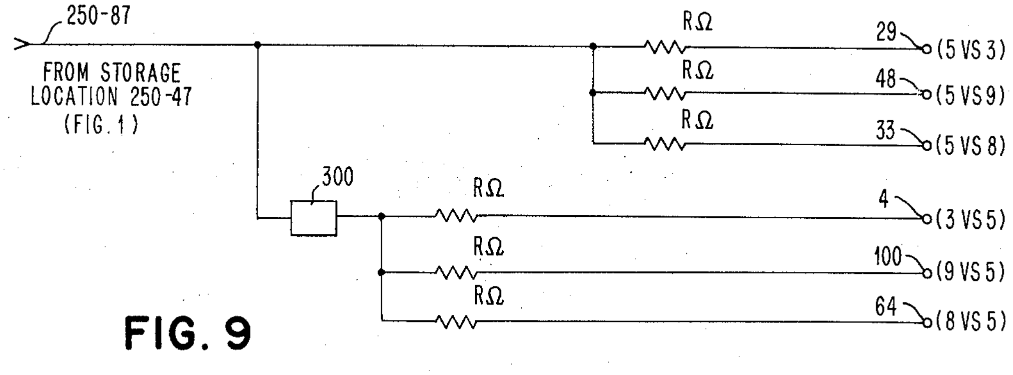
Figure 10:
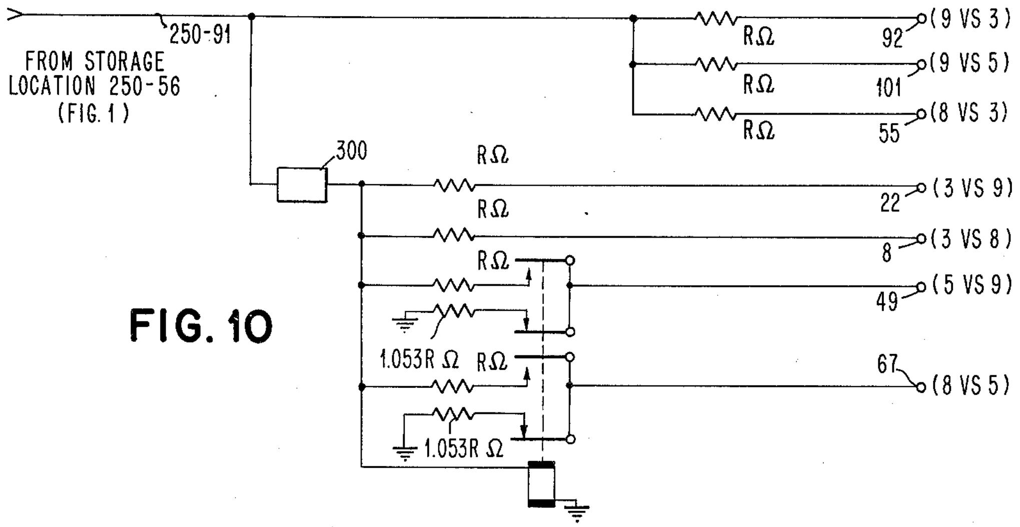
Figure 11:
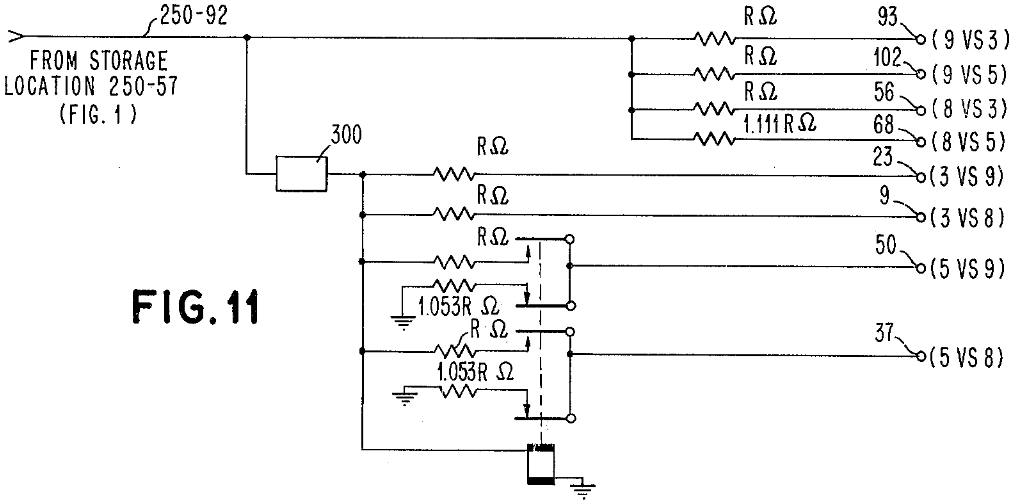
Figure 12:
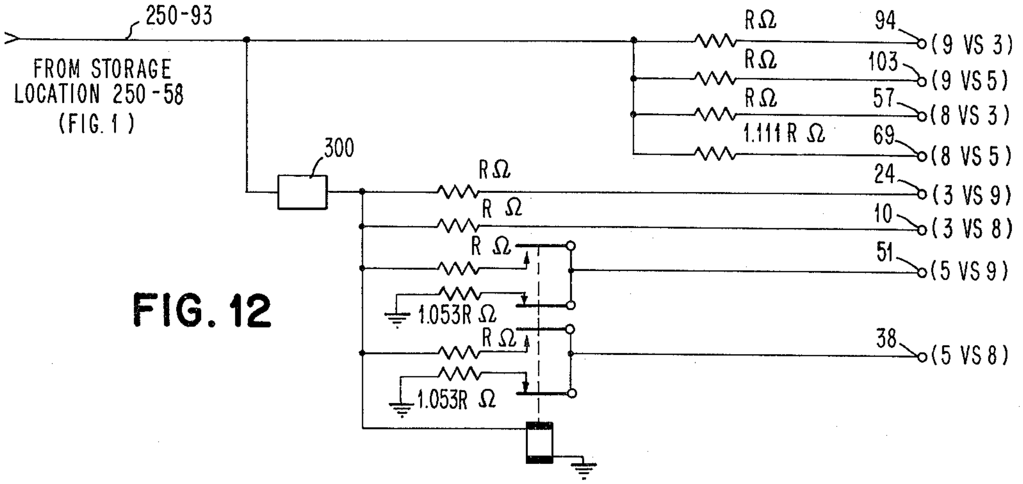
Figure 13:
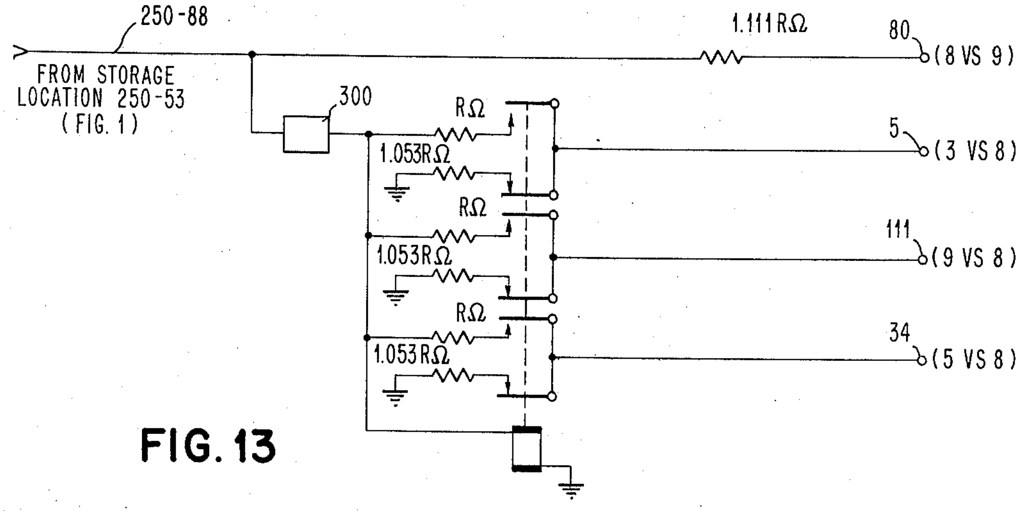
Figure 14:
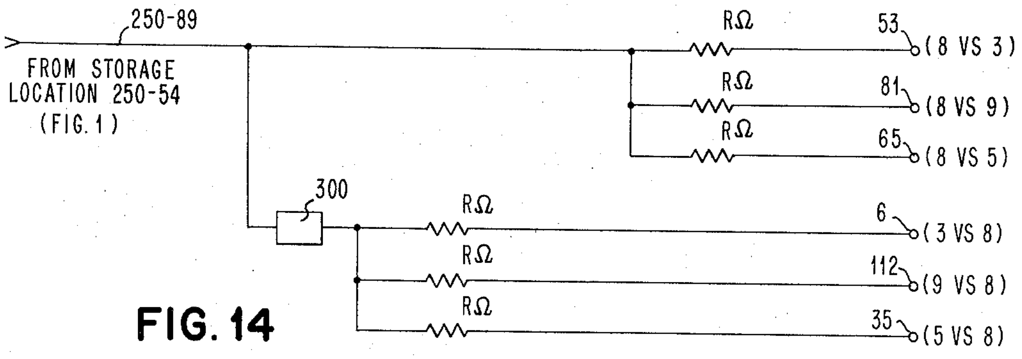
Figure 15:
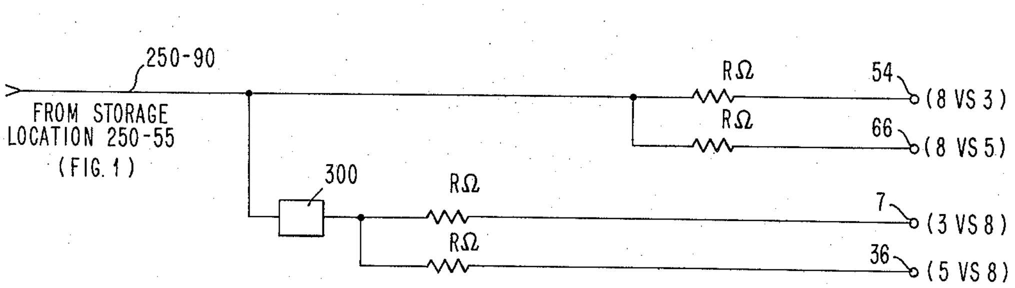
Figure 16:
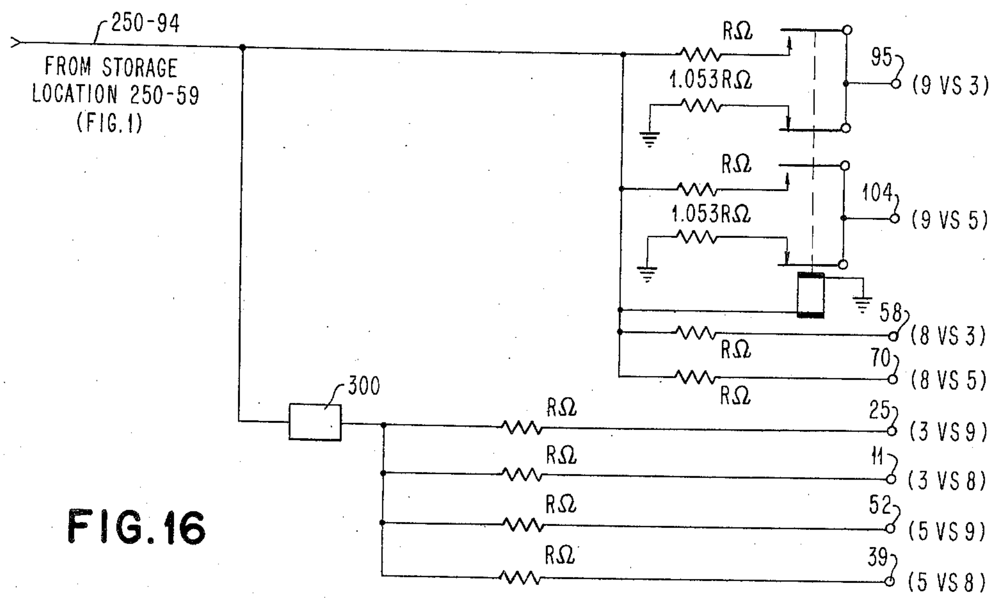
Figure 17:
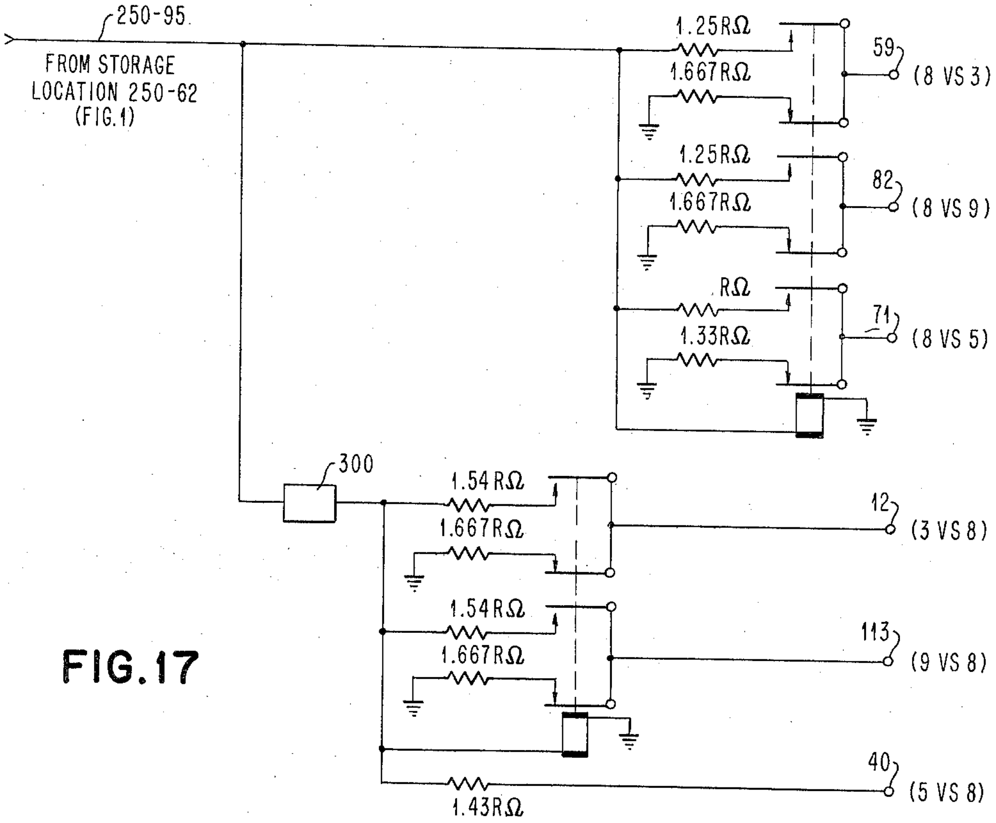
Figure 18:
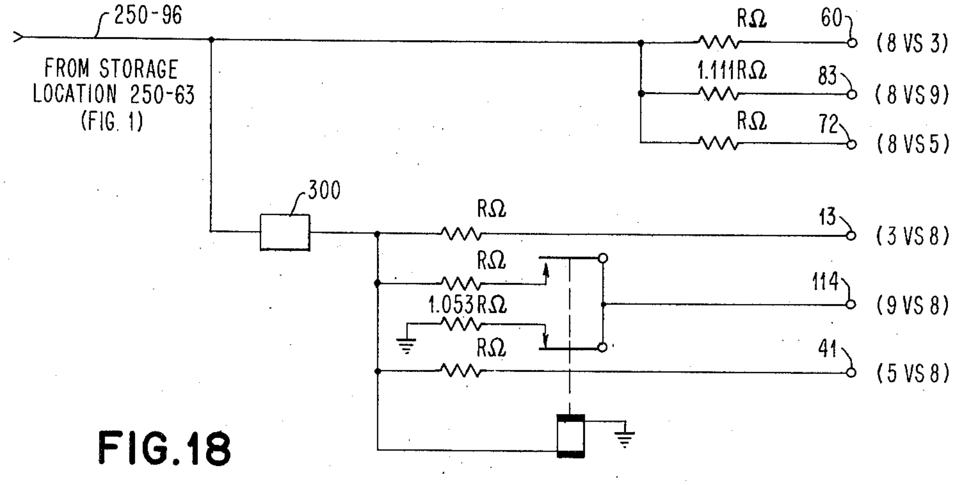
Figure 19:
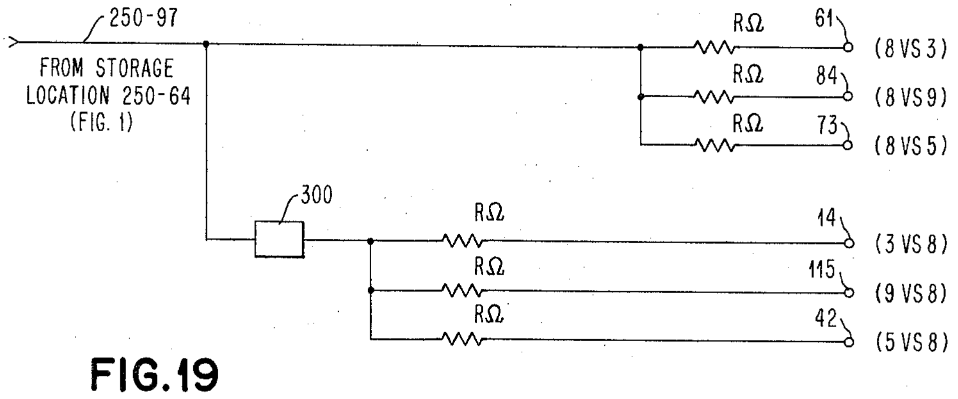
Figure 20:
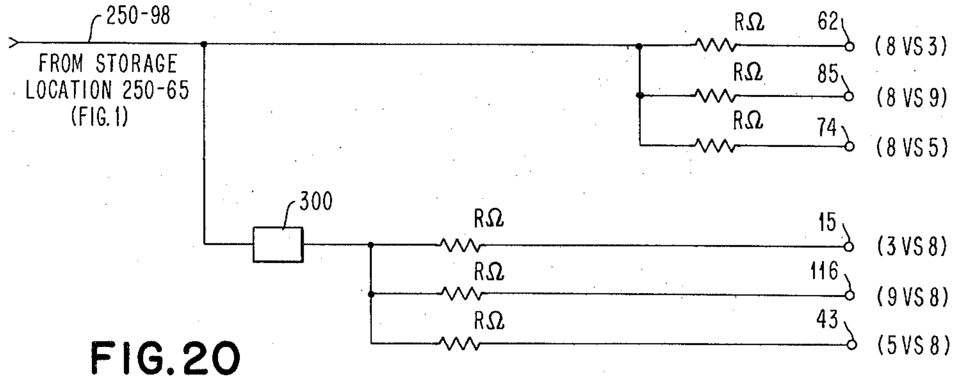
Figure 21:
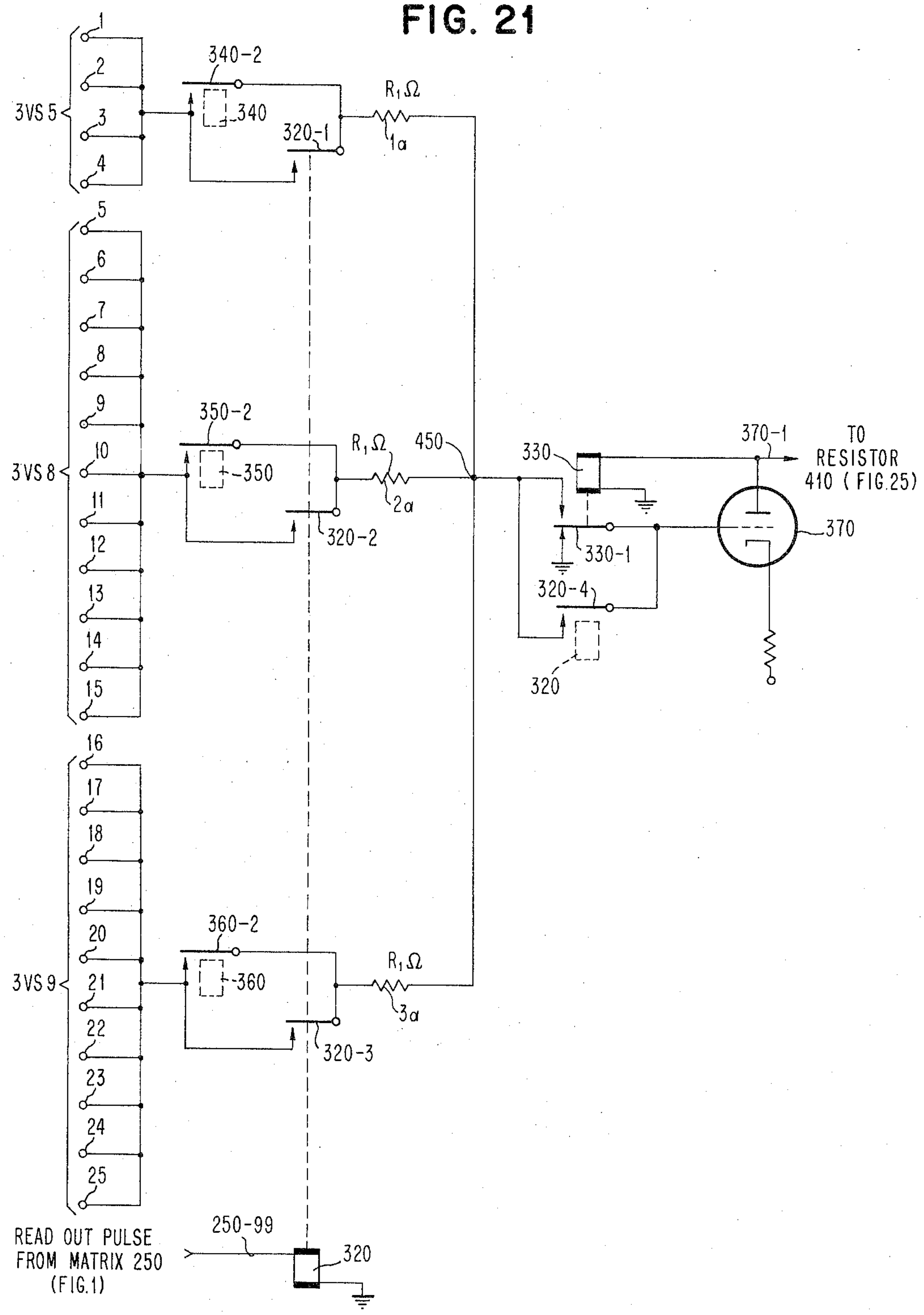
FIGS. 21 through 24 are schematic diagrams of decision circuits which are coupled to the outputs of the circuits shown in FIGS. 2 through 20.
Figure 22:
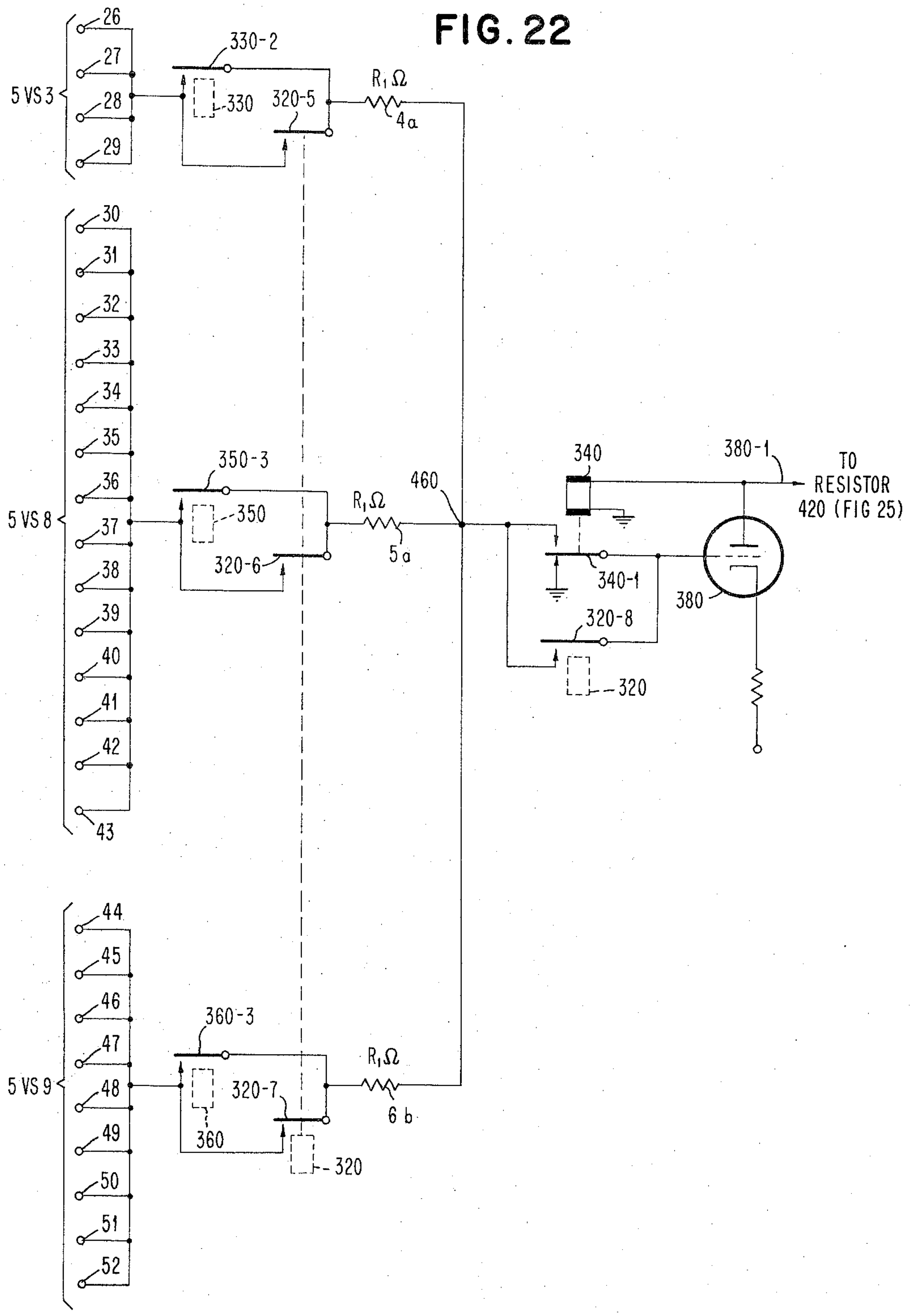
Figure 23:
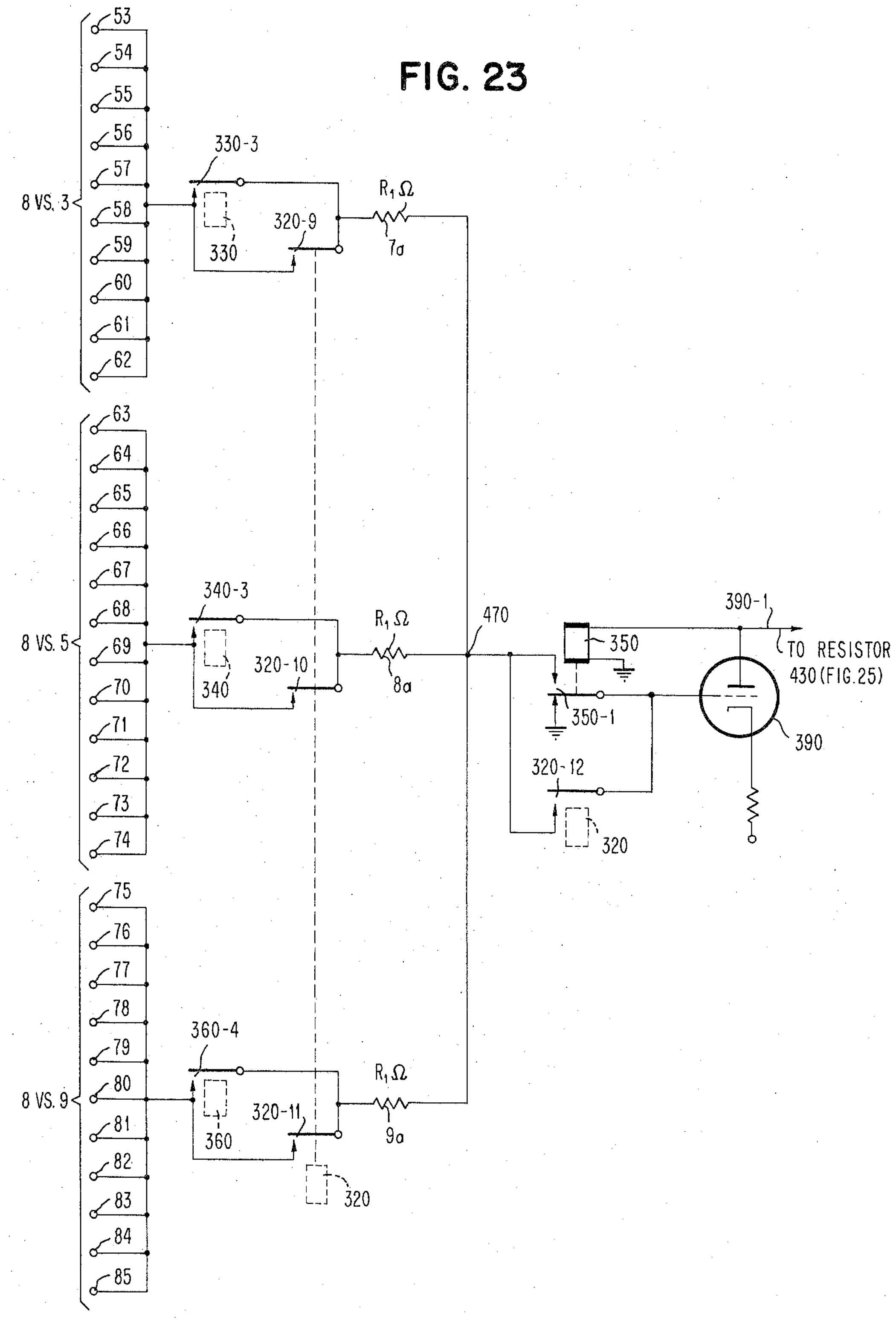
Figure 24:
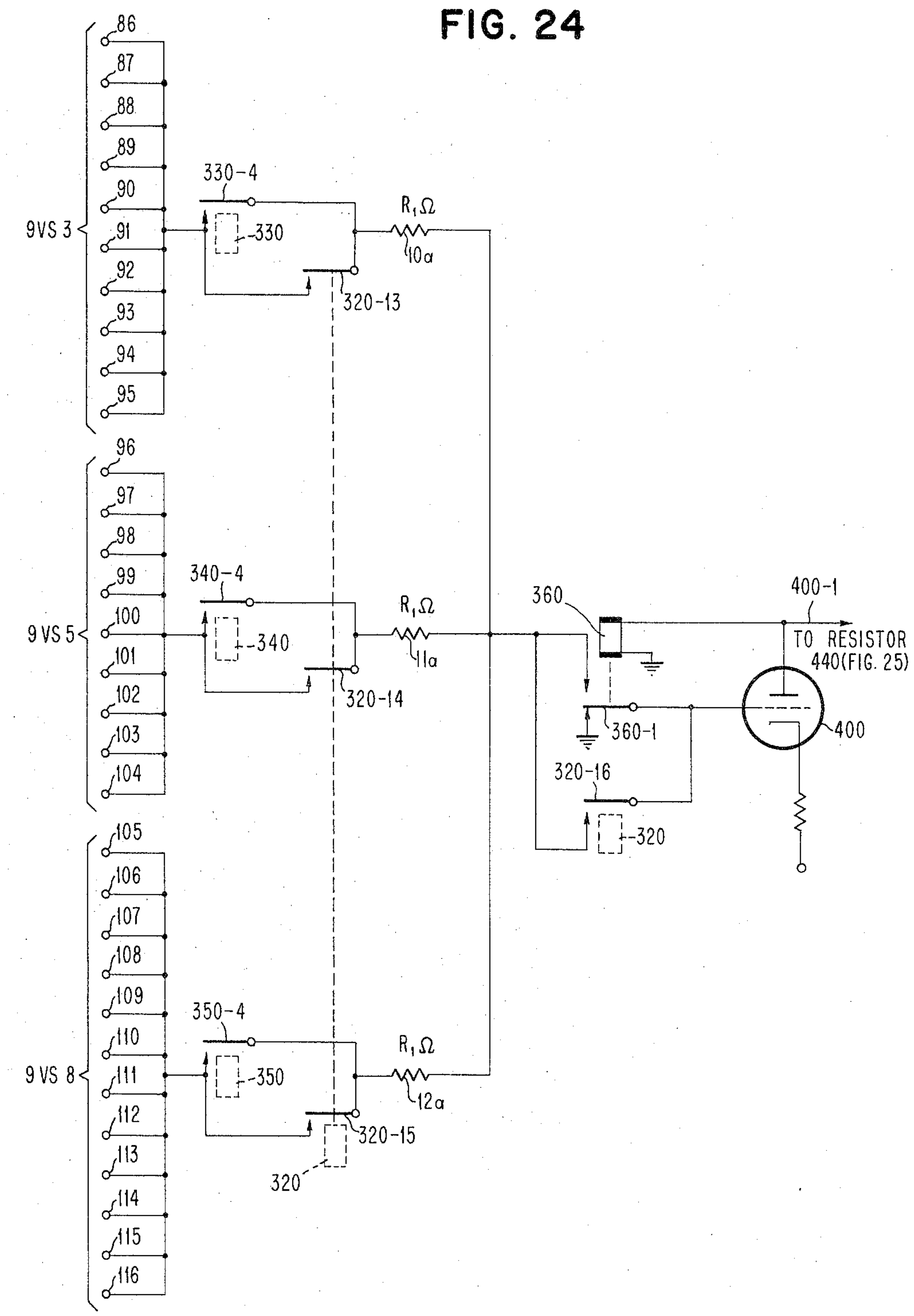

FIGS. 21 through 24 illustrate logic circuits for handling the conflict pairs corresponding to the four characters "3," "5," "8," and "9." The circuit of FIG. 21 is basically related to the character "3" and resolves the conflict pairs (3 vs. 5), (3 vs. 8), and (3 vs. 9). The circuit shown in FIG. 22 is related to the character "5" and resolves the conflict pairs (5 vs. 3), (5 vs. 8), and (5 vs. 9). The circuit shown in FIG. 23 is related to the character "8" and resolves the conflict pairs (8 vs. 3), (8 vs. 5), and (8 vs. 9) and the circuit of FIG. 24 is related to the character "9" and resolves the conflict pairs (9 vs. 3), (9 vs. 5), and (9 vs. 8). The circuits of FIGS 21 through 24 have one hundred and sixteen input terminals designated 1 through 116 which are contiguous with the similarly designated terminals shown in FIGS. 2 through 20. Thus, input terminal 1 in FIG. 21 and output terminal 1 of FIG. 4 are the same, input terminal 2 of FIG. 21 and output terminal 2 of FIG. 5 are the same, etc.

In FIG. 21, input terminals 1 through 4 are associated with conflict pair (3 vs. 5), input terminals 5 through 15 are associated with conflict pair (3 vs. 8) and input terminals 16 through 25 are associated with conflict pair (3 vs. 9). Input terminals 1 through 4 are coupled in common at normally open contact 340–2 which is in turn coupled to one side of an $R_1$ ohm resistor **1*a*. $R_1$ is normally much larger than R. Input terminals 5 through 15 are coupled in common at normally open contact 350–2 which is in turn coupled to one side of an $R_1$ ohm resistor 2*a*, and input terminals 16 through 25 are coupled in common at normally open contact 360–2 which is in turn coupled to one side of an $R_1$ ohm resistor 3*a*. The other sides of resistors 1*a*, 2*a*, and 3*a* are connected in common at junction 450, which is in turn connected through normally open contact 330–1 to the grid of triode 370. Contact 330–1, when normally open, is connected to ground potential to avoid a floating grid condition. Triode 370 is normally non-conducting and its plate electrode is coupled to relay 330. Relay 330, when energized by current from triode 370, will close contact 330–1 as well as contact 330–2 (FIG. 22), contact 330–3 (FIG. 23), contact 330–4 (FIG. 24) and contact 330–5 (FIG. 25) to be later described. The plate circuit of triode 370 is also connected to resistor 410 (FIG. 25) via lead 370–1**.

Contacts 340–2, 350–2, 260–2, and 330–1 are in parallel with contacts 320–1, 320–2, 320–3, and 320–4 respectively. Contacts 320–1, 320–2, 320–3, and 320–4 are normally open and are closed when relay 320, to which they are connected, is energized. The operation of the circuits of FIGS. 21 through 24 will be discussed subsequent to a description of related FIGS. 22, 23, and 24.

Figure 25:
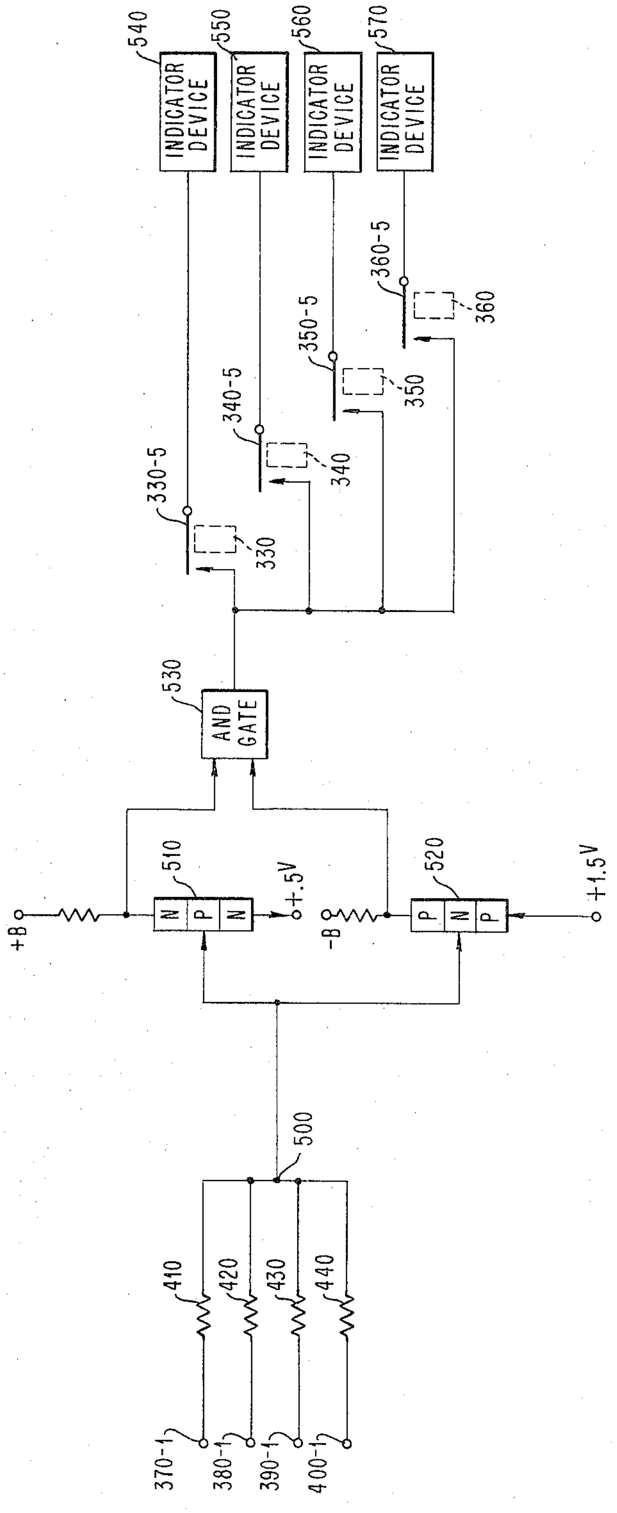
FIG. 25 is a schematic diagram of an indicator circuit coupled to the outputs of the circuits shown in FIGS. 21 through 24.

Referring to FIG. 22, a circuit similar in structure to that of FIG. 21 is shown, but which is associated with the character "5." Input terminals 26 through 52 correspond to the similarly designated output terminals in FIGS. 2 through 20. Terminals 26 through 29 (associated with conflict pair 5 vs. 3) are coupled in common at normally open contact 330–2 which in turn is connected to one side of $R_1$ ohm resistor **4*a*. Terminals 30 through 43 (associated with conflict pair 5 vs. 8) are coupled in common at normally open contact 350–3 which in turn is connected to one side of $R_1$ ohm resistor 5*a* and terminals 44 through 52 (associated with conflict pair 5 vs. 9) are coupled in common at normally open contact 360–3 which in turn is connected to one side of $R_1$ ohm resistor 6*a*. The other sides of resistors 4*a*, 5*a*, and 6*a* are coupled in common to junction 460 which is in turn coupled through normally open contact 340–1 to the grid of normally non-conducting triode 380. Contact 340–1 is grounded when open. The plate of triode 380 is coupled to relay 340. Relay 340, when energized by current from triode 380, will close contact 340–1 as well as contact 340–2 (FIG. 21), contact 340–3 (FIG. 23), contact 340–4 (FIG. 24), and contact 340–5 (FIG. 25). The plate of triode 380 is also connected to resistor 420 (FIG. 25) via lead 380–1**.

Contacts 330–2, 350–3, 360–3, and 340–1 are in parallel respectively with contacts 320–5, 320–6, 320–7 and 320–8, also normally open. Contacts 320–5 through 320–8 are coupled to relay 320 (FIG. 21) which closes these contacts when energized.

The circuits of FIGS. 23 and 24 are similar to those of FIGS. 21 and 22. The circuit of FIG. 23 relates to character "8" and the circuit of FIG. 24 relates to character "9." The circuit of FIG. 23 includes input terminals 53 through 85 and that of FIG. 24 includes input terminals 86 through 116, all corresponding to the similarly designated output terminals of FIGS. 2 through 20.

In FIG. 23, terminals 53 through 62 (associated with conflict pair 8 vs. 3) are coupled through normally open contact 330–3 to one side of $R_1$ ohm resistor **7*a*. Likewise terminals 63 through 74 (conflict pair 8 vs. 5) are coupled through normally open contact 340–3 to $R_1$ ohm resistor 8*a*, terminals 75 through 85 (conflict pair 8 vs. 9) are coupled through normally open contact 360–4 to $R_1$ ohm resistor 9*a*. The other sides of resistors 7*a*, 8*a***, and 9*a* are coupled in common to junction 470 which is coupled through normally open contact 350–1 to the grid of normally non-conducting triode 390. Contact 350–1, when open, connects the grid of triode 390 to ground. The plate of triode 390 is coupled to relay 350. Relay 350, when energized, closes contact 350–1 as well as contact 350–2 (FIG. 21), contact 350–3 (FIG. 22), contact 350–4 (FIG. 24), and contact 350–5 (FIG. 25). The plate circuit of triode 390 is also connected to resistor 430 (FIG. 25) via lead 390–1. Contacts 330–3, 340–3, 360–4, and 350–1 are in parallel respectively with contacts 320–9, 320–10, 320–11, and 320–12. Contacts 320–9, 320–10, 320–11, and 320–12 are normally open and are closed when relay 320 (FIG. 21), to which they are connected, is energized.

In FIG. 24, terminals 86 through 95 (conflict pair 9 vs. 3) are coupled to $R_1$ ohm resistor **10*a* through normally open contact 330–4. Terminals 96 through 104 (conflict pair 9 vs. 5) are coupled to $R_1$ ohm resistor 11*a* through normally open contact 340–4, and terminals 105 through 116 (conflict pair 9 vs. 8) are coupled to $R_1$ ohm resistor 12*a* through normally open contact 350–4**.

The other sides of resistors **10*a*, 11*a*, and 12*a* are coupled in common to junction 480 which is coupled through normally open contact 360–1 to the grid of normally non-conducting triode 400. Contact 360–1, when open, connects the grid of triode 400 to ground. The plate of triode 400 is coupled to relay 360. Relay 360, when energized, closes contact 360–1 as well as contact 360–2 (FIG. 21), contact 360–3 (FIG. 22), contact 360–4 (FIG. 23), and contact 360–5 (FIG. 25). The plate circuit of triode 400 is also connected to resistor 440 (FIG. 25) via lead 400–1**.

Contacts 330–4, 340–4, 350–4, and 360–1 are connected in parallel with contacts 320–13, 320–14, 320–15, and 320–16 respectively. Contacts 320–13 through 320–16 are normally open and are connected to relay 320 (FIG. 21) which, when energized, closes the contacts.

Referring now to the operation of the circuits of FIGS. 21 through 24, it was stated that the terminals 1 through 116 are the same as the similarly numbered terminals shown in FIGS. 2 through 20. Terminal 1 is shown in FIG. 4 coupled to either a +V volt signal or ground potential via R ohm resistor 310–27. Terminal 2 is shown in FIG. 5 coupled to either a +V volt signal or ground potential via an R ohm resistor 310–29. Each of the remaining terminals 3 through 116 are coupled to either a +V volt signal or ground potential through a resistor of R ohms or larger. Particular terminals, for example terminal 44 (see FIG. 2), are coupled to one of two possible resistors depending on whether the signal from the associated storage location of matrix 250 (FIG. 1) is a 0-bit or a 1-bit. As previously discussed, the value of the resistor connected to each of the terminals 1 through 116 in FIGS. 21 through 24, and the determination whether such resistors will be grounded or have +V volts applied thereto will depend on the "weight" or importance the presence or absence of a "property" in each of the storage locations 250–1 through 250–70 (FIG. 1) has on each of the conflict pairs associated with the terminals 1 through 116. FIGS. 21, 22, 23, and 24 show how the terminals associated with the same conflict pairs are coupled together to effect a summation of the results produced by the weighting circuits in FIGS. 2 through 20.

Triodes 370, 380, 390, and 400 are normally non-conducting and are turned on when the voltage applied to their grids exceeds 0.7V volt. When triode 370 conducts, it energizes relay 330 closing contacts 330–1 through 330–5. Triode 380 energizes relay 340, closing contacts 340–1 through 340–5. Triode 390 energizes relay 350, closing contacts 350–1 through 350–5, and triode 400 energizes relay 360 closing contacts 360–1 through 360–5. When triodes 370, 380, 390, and 400 stop conducting, relays 330, 340, 350, and 360 de-energize and their associated contacts open.

In FIG. 21, when the system is in a quiescent state, that is, when no signals are transmitted from matrix 250 through the circuits of FIGS. 2 through 20, all the triodes are non-conducting and contacts 340–2, 350–2, 360–2, and 330–1 are open. When signals are transmitted from matrix 250 through the circuits of FIGS. 2 through 20 to terminals 1 through 25, the open contacts 340–2, 350–2, 360–2, and 330–1 prevent any voltage from being applied to the grid of triode 370 and consequently contacts 340–2, 350–2, 360–2, and 330–1 will never close. In order to correct this situation, contacts 320–1, 320–2, 320–3, and 320–4 connected in parallel with contacts 340–2, 350–2, 360–2, and 330–1 respectively. Contacts 320–1, 320–2, 320–3, and 320–4 (as well as contacts 320–5 through 320–16 in FIGS. 22 through 24) are normally open, and are closed when relay 320 is energized. Relay 320 is a time delay relay which maintains contacts 320–1 through 320–16 closed for a predetermined time period after being energized.

It was stated hereinabove that matrix 250 (FIG. 1) generates an output pulse on lead 250–99 when a specimen has been scanned completely. This pulse energizes relay 320, causing contacts 320–1 through 320–16 to close for a predetermined time period. The closing of contacts 320–1 through 320–16 permits the +V volt signals and reference potential signals (1-bit and 0-bit signals) from matrix 250 which are weighted by the circuits of FIGS. 2 through 20 and applied to terminals 1 through 116, to be applied to the grids of triodes 370, 380, 390, and 400.

The levels of the voltage signals applied to grids of triodes 370, 380, 390, and 400 will differ depending on the specimen being scanned. Each different specimen will produce a different pattern of 1-bits and 0-bits in matrix 250 (FIG. 1). The different patterns of 1-bits and 0-bits will result in different voltage conditions at the outputs of the circuits of FIGS. 2 through 20 (terminals 1 through 116). The terminals 1 through 116 are arranged in the circuits of FIGS. 21 through 24 such that if the specimen contains properties related to a "3" rather than a "5" or "8" or "9," the sum total of the voltage levels on terminals 1 through 25 will be generally higher than the sum totals of the voltage levels on terminals 26 through 52, 53 through 85, or 86 through 116. This is due first to the pattern of the 1-bits and 0-bits in matrix 250 (FIG. 1) and secondly to the weights assigned to these bits by the circuits of FIGS. 2 through 20. It has been statistically determined that when the total voltage level at the input terminals of FIGS. 21 through 24, that is, the voltage level at junctions 450, 460, 470, or 480 is below .7V volt, the specimen is not the character associated with the circuit. For example, if the voltage level at junction 450 were below .7V volt, the probability is great enough to consider that the specimen is not a "3." The cut-off value of triodes 370, 380, 390, and 400 is determined by their bias conditions to be .7V volt, so that if the voltage level at junctions 450, 460, 470, or 480 were below .7V volt, the associated triodes 370, 380, 390, and 400 would cease conduction.

The operation of the circuit of FIG. 21 will then be as follows. Matrix 250 (FIG. 1) would be read-out and the pulse on lead 250–99 would energize relay 320, closing contacts 320–1 through 320–4 (and 320–5 through 320–16) for a predetermined time period. The 1-bit and 0-bit signals from matrix 250 are weighted by the circuits of FIGS. 2 through 20 and the signals on terminals 1 through 25 thereof are summed at junction 450 and applied to the grid of triode 370. If the voltage level at junction 450 is above +.7V volt, triode 370 will conduct, energizing relay 330. Relay 330, when energized, will close contact 330–1 and contact 330–2 (FIG. 22), contact 330–3 (FIG. 23), contact 330–4 (FIG. 24), and contact 330–5 (FIG. 25). A similar operation is also occurring in the circuits of FIGS. 22, 23, and 24. If the signal at the grid of triode 380 is above +.7V volt, contacts 340–1, 340–2 (FIG. 21), 340–3 (FIG. 23), 340–4 (FIG. 4), and 340–5 (FIG. 25) are closed. Likewise if the signals at the grids of triodes 390 (FIG. 23) and 400 (FIG. 24) are above +.7 volt, contacts 350–2 and 360–2 (FIG. 21), 350–3 and 360–3 (FIG. 22), 350–1 and 360–4 (FIG. 23), and 360–1 and 350–4 (FIG. 24) will close.

It is not practically possible for the signals at all four triodes 370, 380, 390, and 400 to be above +.7V volt as this would indicate that the specimen is in probability all four characters, which is an ambiguous result. In fact, the voltage level at the grid of at least one triode will probably be below +.7V volt. Consider the voltage at the grid of triode 370 of FIG. 21 being below +.7V volt. Triode 370 will not conduct and relay 330 will not energize. Thus, contacts 330–1, 330–2 (FIG. 22), 330–3 (FIG. 23), 330–4 (FIG. 24), and 330–5 (FIG. 25) will remain open. After the predetermined time period (the length of which is determined by the time it would normally take triodes 370 through 400 to conduct, energize their associated relays, and close the related contacts) contacts 320–1 through 320–16 will open. In FIG. 21, contacts 330–1 and 320–4 both are now open, so no signal at all reaches the grid of triode 370. This is indicative that the specimen is not a "3." Relay 330 not being energized, contacts 330–2 (FIG. 22), 330–3 (FIG. 23), 330–4 (FIG. 24), and 330–5 (FIG. 25) also remain open. In FIG. 22 contacts 330–2 and 320–5 being open, terminals 26 through 29 are disconnected from the rest of the circuit. Significantly, terminals 26 through 29 are those associated with the conflict pair ("5" vs. "3"). In FIG. 23 both contacts 330–3 and 320–9 being open, terminals 53 through 62, associated with conflict pair ("8" vs. "3") are disconnected form the circuit and in FIG. 24 both contacts 330–4 and 320–13 being open, terminals 86 through 95, associated with conflict pair ("9" vs. "3") are disconnected from the circuit. The effect of this operation is that when the probability that the specimen is not a "3" is determined, the entire circuit (FIG. 21) associated with the character "3" is opened, and the terminals associated with the conflict pairs containing the character "3," i.e. ("5" vs. "3"), ("8" vs. "3"), and ("9" vs. "3") in FIGS. 22, 23, and 24 are disconnected, thereby varying the potentials at junctions 470, 480, and 490. This effectively narrows the identity of the specimen to three possible characters and reduces the decision of each of the remaining circuits to two conflict pairs.

Consider that the disconnecting of terminals 26 through 29 has caused the signal level at junction 460 in FIG.22 to fall below +.7V volt. This indicates that probability of the specimen is not a "5" as between the remaining characters "5", "8," and "9." Triode 380 ceases conduction and relay 340 de-energizes. Contact 340–1 opens and, contact 320–8 being open, the circuit of FIG. 22 is disconnected. Contact 340–2 (FIG. 21) also opens, but the circuit of FIG. 21 being disconnected, this has no effect. Contact 340–3 (FIG. 23) opens and along with open contact 320–10 results in disconnecting terminals 63 through 74, associated with conflict pair ("8" vs. "5") from the rest of the circuit. Contact 340–4 (FIG. 24) opens and contact 320–14 being open, terminals 96 through 104, associated with conflict pair ("9" vs. "5") are disconnected from the rest of the circuit.

At this point the character "5" is removed from consideration as the specimen and the conflict pairs associated with the character "5" are disconnected from the remaining circuits of FIGS. 23 and 24. In FIG. 23, terminals 53 through 74 now have been disconnected and in FIG. 24 terminals 86 through 104 have been likewise disconnected. Consider that by this action the potential at junction 480 (FIG. 24) falls below +.7V volt. Triode 400 ceases conduction and relay 360 de-energizes.

The de-energizing of relay 360 will open contact 360–1 and also contacts 360–2 (FIG. 21) and 360–3 (FIG. 22) with no effect since triodes 370 (FIG. 21) and 380 (FIG. 22) have already been cut-off. Triode 390 (FIG. 23) is now the only triode which is still conducting.

Triode 390 will also become cut-off because the de-energizing of relay 360 (FIG. 24) will open the remaining contact 360–4 (FIG. 23). When contact 360–4 opens, the voltage level at junction 470 becomes zero and triode 390 stops conducting. Relay 350 then de-energizes and the remaining contacts 350–1 through 350–5 open. Triode 390 was the last tube to become cut-off, not because the voltage at junction 470 was below +.7V volt, but because contact 360–4 was opened by relay 360 (FIG. 24). The fact that triode 390 was the last to become cut-off indicates that the specimen being scanned is an "8." In the brief time interval between triode 400 cutting off and relay 360 de-energizing and opening contact 360–4 (in the order of milliseconds) an indicator circuit is energized by triode 390.

Referring to FIG. 25, an indicator circuit is shown which is responsive to signals from the circuits of FIGS. 21 through 24 to indicate the identity of the specimen being scanned. The circuit of FIG. 25 includes four equal valued resistors 410, 420, 430, and 440, respectively, coupled to the plate circuits of triodes 370 (FIG. 21), 380 (FIG. 22), 390 (FIG. 23) and 400 (FIG. 24) via leads 370–1, 380–1, 390–1, and 400–1. Resistors 410, 420, 430, and 440 are coupled in common at junction 500, which is in turn coupled to the bases of transistors 510 and 520. The collectors of transistors 510 and 520 are connected to the input of a two-way "AND" circuit 530. The output of "AND" circuit 530 is coupled through contact 330–5 to indicator device 540, through contact 340–5 to indicator device 550, through contact 350–5 to indicator device 560, and through contact 360–5 to indicator device 570. Contacts 330–5, 340–5, 350–5, and 360–5 are normally open, and are closed only when their associated relays 330, 340, 350, and 360 are energized.

Resistors 410, 420, 430, and 440 form a summing network for the signals from the plate circuits of triodes 370, 380, 390, and 400. Presume, for purposes of explanation, that the voltage across each resistor 410, 420, 430, and 440 was one volt when the associated triode was conducting and zero when the associated triode was not conducting. Thus the potential at junction 500 will be four volts when all the triodes are conducting, three volts when three triodes are conducting, and two volts, one volt, and zero volt, respectively, when two, one, and none of the triodes are conducting. The preceding discussion has shown that all the triodes will ultimately cease conduction, with the last conducting triode, being associated with the character identifying the specimen, remaining in conduction for at least one millisecond. In order to determine when there is one remaining triode conducting a pair of transistors 510 and 520 are connected to junction 500. Transistor 510 is a NPN type with its emitter biased at +.5 volt and transistor 520 is a PNP type with its emitter biased at +1.5 volts. Transistor 510 will conduct only above +.5 volt and transistor 520 will conduct only below +1.5 volts. Thus, transistors 510 and 520 will both be conducting only between +.5 volt and +1.5 volts which is the condition when only one of the triodes in FIGS. 21 through 24 is conducting.

The collectors of transistors 510 and 520 are coupled to "AND" gate 530 which will produce an output only when both transistors are conducting. Thus, an output signal from "AND" gate 530 will occur when only one triode in FIGS. 21 through 24 remains conducting. When only one triode is conducting, only one of contacts 330–5, 340–5, 350–5, and 360–5 will be closed, the other three being opened when the associated triodes stopped conducting. Thus, the signal from "AND" gate 530 which occurs when only one triode remains conducting will be conducted by the closed one of contacts 330–5, 340–5, 350–5, 360–5 associated with such triode. Transistors 510 and 520 operate in a time interval in the order of microseconds, so there will be sufficient time for the circuit of FIG. 25 to operate before the last triode of FIGS. 21 through 24 ceases conducting.

In the present example, triode 390 of FIG. 23 was the last triode to conduct, and therefore contact 350–5 will be closed, conducting the signal from "AND" gate 530 to indicator device 560.

Indicator devices 540, 550, 560, and 570 indicate the identity of the specimen being investigated. Device 540 is associated with the character "3," device 550 is associated with the character "5," device 560 is associated with the character "8" and device 570 is associated with the character "9." The indicator devices may be any one of several known types, such as printers, lamps, or switches, the only criteria being that they be responsive to the signal from "AND" gate 530 to indicate the associated character.

In the preceding description of the operation of the circuits of FIGS. 21, 22, 23, and 24 the triode 370 ceased conducting first, followed by triode 380 and 400, and finally triode 390, indicating the specimen to be an "8." It is to be understood that the circuits do not operate in any particular order, but will operate in different sequences depending on the specimen being scanned. The last triode to conduct will identify the specimen, and the sequence in which the triodes cease conducting will depend on the specimen properties which are present or absent, which in turn determine the voltage conditions at terminals 1 through 116.

It was stated earlier that for a valid specimen it was not practically possible for all the triodes 370, 380, 390, and 400 to remain conducting. However, due to blots, smears, or otherwise imperfect specimens the condition may occur where two or more triodes remain conducting. In such event the voltage at junction 500 of FIG. 25 will be at a level higher than that necessary to switch both transistors 510 and 520, and consequently no character will be indicated by devices 540, 550, 560, or 570. The lack of any indication is itself an indication that the specimen being scanned is erroneous or ambiguous.

It is also to be understood that although the present description was, for clarity, confined to the consideration of four characters, the invention may be extended to operate on any number of characters. It will be obvious to one skilled in the art that if the system were extended to handle ten characters a greater number of the storage locations 250–1 through 250–70 (FIG. 1) would be utilized, and more weighting circuits similar to those shown in FIGS. 2 through 20 would be required with the resistors employed being calculated as taught herein. Ten separate logic circuits similar to those shown in FIGS. 21 through 24 would be employed, with the relay coil in each circuit operating contacts associated with related conflict pairs in each of the other circuits. The circuit of FIG. 25 would be modified such that ten equal valued resistors would be coupled to junction 500, and ten indicator devices would be used preceded by ten contacts.

Figure 26:
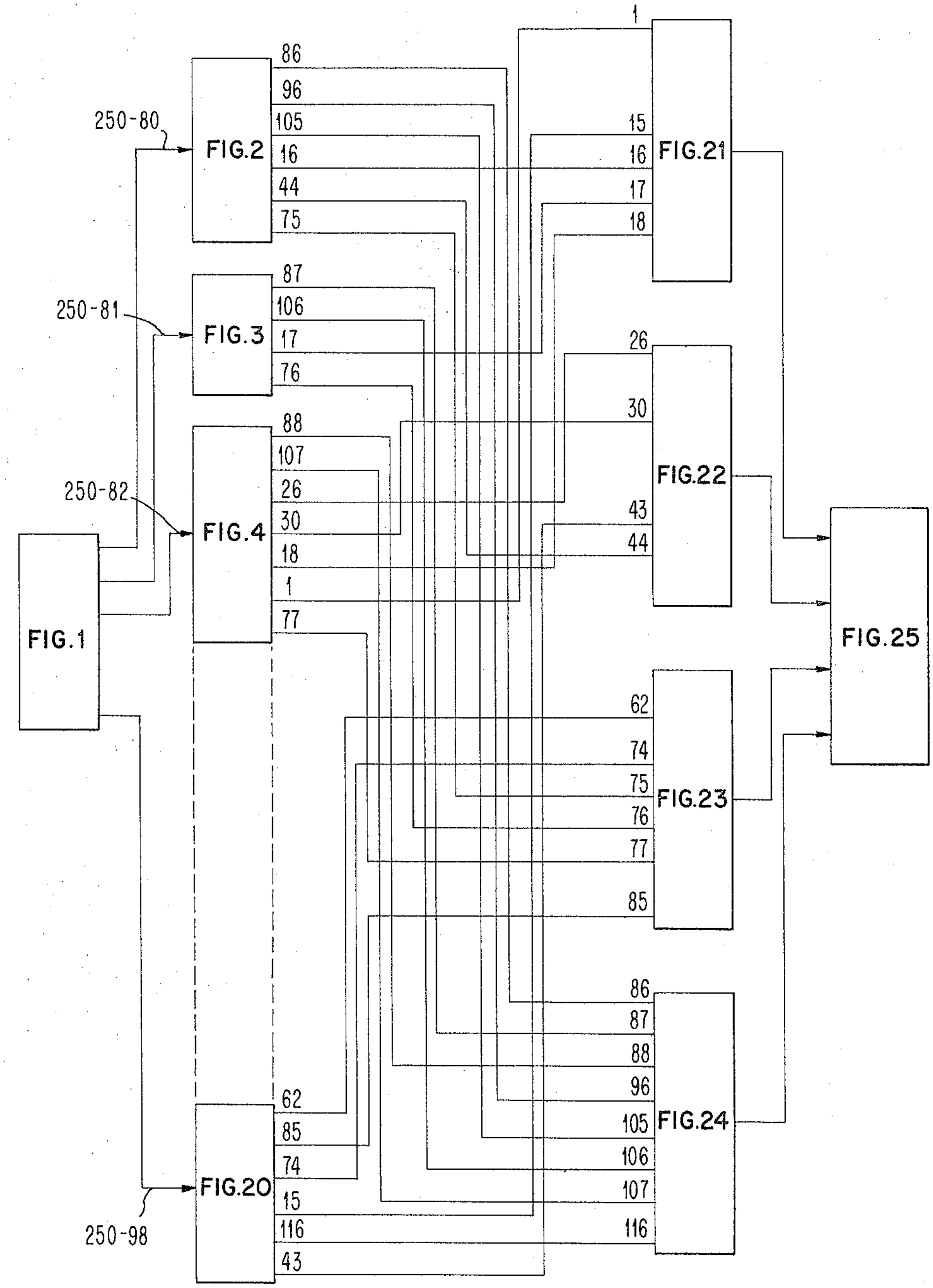
FIG. 26 is a block diagram illustrating the manner in which the circuits shown in FIGS. 1 through 25 are interconnected.

FIG. 26 is a system block diagram illustrating, for purposes of clarity, the manner in which the circuits shown in FIGS. 1 through 25 are interconnected. FIG. 26 shows FIG. 1, which includes the read head and character matrix connected to the blocks representing FIGS. 2 through 20 via leads 250–80 through 250–98. For simplicity, the blocks of FIGS. 5 through 19 are not shown, however, they are connected in the same general scheme, and the details of the connections are shown in the individual figures. The blocks designated as FIGS. 2 through 20 represent the nineteen weighting circuits, and their output terminals are individually designated. The output terminals 86, 96, 105, etc. are connected to the corresponding input terminals 86, 96, 105, etc. of the blocks representing FIGS. 21 through 24. The blocks designated as FIGS. 21 through 24 represent respectively the logic circuits associated with the characters "3," "5," "8," and "9." FIGS. 21 through 24 are connected to the indicator circuit block (FIG. 25). The function and operation of each of the blocks shown in FIG. 26 has been fully discussed hereinabove, and repetition is not considered necessary. FIG. 26 is included basically for the purpose of providing a single illustration of the interconnections of FIGS. 1 through 25 which were set forth separately on the individual figures.

From the foregoing description it is seen that new and useful circuitry has been provided for specimen recognition systems. The circuitry has the advantage that the properties of the specimen under consideration may be selectively weighted, with various values of rewards and punishments assigned to particular properties in proportion to their importance in determining particular specimens. This permits the use of properties which rarely appear, but which are significant when present. Further, the circuitry sums the weighted properties for individual conflict pairs and performs logical decisions in order to eliminate particular specimens from consideration. When each particular specimen is eliminated the other conflict pairs containing that specimen are also eliminated, thereby reducing the complexity of the subsequent logical decisions.

The invention was shown and described with relation to a character identification embodiment, but it is to be understood that the principles of the invention may be applied to specimen recognition systems in general.

While the invention has been particularly shown and described with reference to a preferred embodiment thereof, it will be understood by those skilled in the art that various changes in form and details may be made therein without departing from the spirit and scope of the invention.

What is claimed is:

1. A specimen identification system for determining the identity of a specimen within a group of predetermined specimens, each having a separate plurality of distinguishing properties comprising, a plurality of examining means each of which examines a separate given portion of a specimen for producing a first type signal representative of the presence of a distinguishing property at said given portion of said specimen and a second type signal representative of the absence of said distinguishing property at said same given portion, a plurality of resistor circuits coupled to said plurality of examining means, each resistor circuit being responsive to a separate one of said first and second type signals from a separate one of said examining means for modifying each of said first and second type signals in accordance with predetermined weighting factors, each of said resistor circuits including a first branch having at least one resistor circuit therein and an associated output terminal and a second branch having an inverter circuit and at least one resistor therein and an associated output terminal, combining means including a first plurality of resistors, each resistor thereof being coupled to a separate one of said output terminals of said plurality of said resistor circuits and responsive to the one of said first and second type signals thereat, and first coupling means connecting selected ones of said first plurality of resistors to common junctions for combining said first and second type signals into groups of composite signals having magnitudes determined by said combined first and second type signals, and means responsive to the magnitudes of said groups of composite signals for determining the identity of said one of said specimens.

2. A specimen identification system according to claim 1 wherein said means responsive to the magnitudes of said groups of composite signals includes a plurality of means, each producing an output signal in response to input signals above a given magnitude, and second coupling means connecting selected ones of said common junctions of said combining means to the inputs of selected ones of said signal producing means, said signal producing means being responsive to said composite signals from said common junctions for producing a signal when the magnitude of said composite signals exceeds said given magnitude.

3. A specimen identification system according to claim 2 wherein said means responsive to the magnitude of said groups of composite signals for determining the identity of said one of said specimens includes a second plurality of resistors, each resistor of said second plurality of resistors being coupled to the output of a separate one of said signal producing means and responsive to the signals therefrom, means coupled to each of said second plurality of resistors for detecting the presence of a single one only of the signals from said signal producing means, and means responsive to said detecting means for indicating the identity of said one of said specimens.

4. A specimen identification system according to claim 2 wherein said means responsive to the magnitude of said groups of composite signals further includes a separate switching means coupled to the output of each of said signal producing means, each of said switching means being connected to selected ones of said first and second coupling means, said switching means being responsive to the output signal from said associated signal producing means for opening said selected first and second coupling means for disconnecting said selected resistors of said first plurality of resistors associated therewith from said common junctions and for disconnecting said selected common junctions from said signal producing means.

5. A specimen identification system according to claim 4 wherein each of said switching means are connected to selected ones of said first and second coupling means, said selected first coupling means being selected such that all the first coupling means connected to each switching means are associated with a common one of the specimens within said group of predetermined specimens and said second coupling means connected to each switching means also connected to the said signal producing means which is connected to said each switching means.

6. A character recognition system for determining the identity of a specimen character within a group of predetermined different characters, each having a separate plurality of distinguishing properties comprising, means for examining said specimens character for producing first type signals representative of the presence of said distinguishing properties and second type signals representative of the absence of said distinguishing properties, a plurality of resistor circuits coupled to said examining means each resistor circuit being responsive to a separate one of said first and second type signals from said examining means for modifying each of said first and second type signals in accordance with predetermined weighting factors, each of said resistor circuits including a first branch having at least one resistor circuit therein and an associated output terminal and a second branch having a signal converter and at least one resistor therein and an associated output terminal, combining means including a first plurality of resistors, each resistor thereof being coupled to a separate one of said output terminals of said plurality of resistor circuits and responsive to the one of said first and second type signals thereat, and first coupling means connecting selected ones of said first plurality of resistors to common junctions for combining said first and second type signals into groups of composite signals having magnitudes determined by said combined first and second type signals, and means responsive to the magnitudes of said groups of composite signals for determining the identity of said specimen character including a plurality of means for producing a signal in response to input signals above a given magnitude and second coupling means connecting selected ones of said common junctions of said combining means to the inputs of selected ones of said signal producing means, said signal producing means being responsive to said composite signals from said common junctions for producing a signal when the magnitude of said composite signals exceeds said given magnitude and a separate switching means coupled to the output of each of said signal producing means, each of said switching means being connected to selected ones of said first and second coupling means, said switching means being responsive to the output signal from said associated signal producing means for opening said selected first and second coupling means for disconnecting said selected resistors of said first plurality of resistors associated therewith from said common junctions and disconnecting said selected common junctions from said signal producing means.

References Cited by the Examiner

UNITED STATES PATENTS

| | | | |
|---|---|---|---|
| 2,889,535 | 6/1959 | Rochester et al. | 340—146.3 |
| 2,978,675 | 4/1961 | Highleyman | 340—146.3 |
| 3,104,369 | 9/1963 | Rabinow | 340—146.3 |

MALCOLM A. MORRISON, *Primary Examiner.*